United States Patent
Chen et al.

(10) Patent No.: US 11,258,314 B2
(45) Date of Patent: Feb. 22, 2022

(54) METHOD AND DEVICE FOR IMPROVING EFFICIENCY OF ELECTROMAGNETIC TRANSIENTS PROGRAM PHASE DOMAIN SYNCHRONOUS MACHINE MODEL

(71) Applicant: Tsinghua University, Beijing (CN)

(72) Inventors: Ying Chen, Beijing (CN); Yankan Song, Beijing (CN); Shaowei Huang, Beijing (CN); Chen Shen, Beijing (CN)

(73) Assignee: Tsinghua University, Beijing (CN)

( * ) Notice: Subject to any disclaimer, the term of this patent is extended or adjusted under 35 U.S.C. 154(b) by 317 days.

(21) Appl. No.: 16/565,159

(22) Filed: Sep. 9, 2019

(65) Prior Publication Data

US 2020/0185980 A1 Jun. 11, 2020

(30) Foreign Application Priority Data

Dec. 7, 2018 (CN) .......................... 201811496740.3

(51) Int. Cl.
*G06F 17/14* (2006.01)
*H02K 1/14* (2006.01)
(Continued)

(52) U.S. Cl.
CPC ............. *H02K 1/145* (2013.01); *G06F 17/14* (2013.01); *G06F 17/16* (2013.01); *H02K 1/18* (2013.01); *H02K 1/26* (2013.01)

(58) Field of Classification Search
None
See application file for complete search history.

(56) References Cited

U.S. PATENT DOCUMENTS

| | | | | |
|---|---|---|---|---|
| 4,217,515 A | * | 8/1980 | Long | ............ H02K 1/26 310/270 |
| 2013/0141084 A1 | * | 6/2013 | Hsieh | ............ G06F 3/046 324/207.16 |

OTHER PUBLICATIONS

Xia, Y et al., An Efficient Phase Domain Synchronous Machine Model With Constant Equivalent Admittance Matrix, IEEE Transactions On Power Delivery, Jun. 2019, pp. 929-940, vol. 34, No. 3, IEEE.

* cited by examiner

*Primary Examiner* — Craig C Dorais
(74) *Attorney, Agent, or Firm* — IP & T Group LLP

(57) ABSTRACT

The present disclosure provides a method for improving the computational efficiency of an electromagnetic transients program (EMTP-type) phase domain synchronous machine model. The method comprises: acquiring a traditional phase domain synchronous machine model; acquiring matrix relations between mutual inductance matrices of stator windings and rotor windings according to a trigonometric transformation equation; substituting the matrix relations into the original expression of $R_{eq}$ and the original formulation of $e_h(t)$, respectively, and deriving to obtain a simplified formulation of the equivalent resistance matrix $R_{eq}$ and a simplified formulation of the total history term $e_h(t)$; and acquiring an efficient phase domain synchronous machine model. According to the embodiment of the disclosure, in the provided model, the equivalent resistance matrix of the phase domain synchronous machine model and the matrix used in the calculation of the history term are converted into constant sparse matrices, thereby improving the calculation efficiency of the model.

10 Claims, 3 Drawing Sheets

(51) Int. Cl.
*H02K 1/18* (2006.01)
*G06F 17/16* (2006.01)
*H02K 1/26* (2006.01)

METHOD AND DEVICE FOR IMPROVING EFFICIENCY OF ELECTROMAGNETIC TRANSIENTS PROGRAM PHASE DOMAIN SYNCHRONOUS MACHINE MODEL

The present application claims priority of Chinese Patent Application No. 2018114967403 filed on Dec. 7, 2018, which is incorporated herein by reference in its entirety.

FIELD OF TECHNOLOGY

The present disclosure relates to the field of electromagnetic transient simulation of a power system, and in particular, to a method and device for improving the computational efficiency of an electromagnetic transients program (EMTP-type) phase domain synchronous machine model.

BACKGROUND

Synchronous generators form the principal source of electric energy in power systems. Many large loads are driven by synchronous motors. Synchronous generators and synchronous motors operate on the same principle and are collectively referred to as synchronous machines. The accurate modeling of their dynamic performance is of fundamental importance to the transient analysis. The modeling of synchronous machines has been an active topic of research for many years. A number of machine models have been developed and implemented in various electromagnetic transients programs (EMTP) including PSCAD, Micro Tran, ATP and EMTP-RV, where dq0 machine models are typically used. However, when to be connected to network models represented in the abc phase domain, the dq0 models do have indirect interfaces, which cause additional interface error and affect the accuracy of the simulation.

To provide a direct machine-network interface, a phase domain synchronous machine model has been proposed in references. The numerical stability and accuracy of the machine model is improved due to the direct machine-network interface. However, the formulation of the phase domain synchronous machine model is complicated, resulting in an increase in computational costs.

SUMMARY

In view of the disadvantages of the traditional EMTP-type phase domain synchronous machine model as heavy computing burden and low computational efficiency, embodiments of the present disclosure provide a method for improving the computational efficiency of the phase domain model.

According to a first aspect, an embodiment of the present disclosure provides a method for improving the computational efficiency of the EMTP-type phase domain synchronous machine model, comprising:

S1, acquiring a traditional phase domain synchronous machine model; wherein the traditional phase domain synchronous machine model is: $v_{abcs}(t)=R_{eq}i_{abcs}+e_h(t)$;

where $R_{eq}$ represents the equivalent resistance matrix; $i_{abcs}(t)$ represents the stator currents; $e_h(t)$ represents the total history term;

S2, acquiring matrix relations between a mutual inductance matrix of stator windings and a mutual inductance matrix of rotor windings according to a trigonometric transformation equation;

S3, substituting the matrix relations into the original expression of $R_{eq}$ and the original expression of $e_h(t)$ respectively and deriving to obtain a simplified formulation of the equivalent resistance matrix $R_{eq}$ and a simplified formulation of the total history term $e_h(t)$; and S4, acquiring an efficient phase domain synchronous machine model according to the simplified formulation of the equivalent resistance matrix $R_{eq}$ and the simplified formulation of the total history term $e_h(t)$.

According to a second aspect, an embodiment of the present disclosure provides a device for improving the computational efficiency of the EMTP-type phase domain synchronous machine model, comprising:

an acquirement module, suitable for acquiring a traditional phase domain synchronous machine model; wherein the traditional phase domain synchronous machine model is: $v_{abcs}(t)=R_{eq}i_{abcs}+e_h(t)$; where $R_{eq}$ represents the equivalent resistance matrix; $i_{abcs}(t)$ represents stator currents; $e_h(t)$ represents the total history term;

a trigonometric transformation module, suitable for acquiring matrix relations between a mutual inductance matrix of stator windings and a mutual inductance matrix of rotor windings according to a trigonometric transformation equation;

a deriving module, suitable for substituting the matrix relations into the original expression of $R_{eq}$ and the original expression of $e_h(t)$ respectively and deriving to obtain a simplified formulation of the equivalent resistance matrix $R_{eq}$ and a simplified formulation of the total history term $e_h(t)$; and a simplifying module, suitable for acquiring an efficient phase domain synchronous machine model (hereinafter, also referred to as an efficient model) according to the simplified formulation of the equivalent resistance matrix $R_{eq}$ and the simplified formulation of the total history term $e_h(t)$.

According to a third aspect, an embodiment of the present disclosure provides an electronic apparatus, comprising:

at least one processor, at least one memory, a communication interface, and a bus; wherein the processor, the memory, and the communication interface communicate with each other via the bus; and program instructions which can be executed by the processor are stored in the memory, and the processor calls the program instructions to perform a method for improving the computational efficiency of the EMTP-type phase domain synchronous machine model provided by any of various possible implementations according to the first aspect.

According to a fourth aspect, an embodiment of the present disclosure provides a non-transitory computer readable storage medium, which stores computer instructions that enable the computer to perform the method for improving the computational efficiency of the EMTP-type phase domain synchronous machine model provided by any of various possible implementations according to the first aspect.

According to the method for improving the computational efficiency of the EMTP-type phase domain synchronous machine model provided by the embodiment of the disclosure, matrix relations between a mutual inductance matrix of stator windings and a mutual inductance matrix of rotor windings is acquired through a trigonometric transformation from the traditional phase domain synchronous machine model as a basis, and the matrix relations are substituted into the traditional phase domain synchronous machine model, such that the equivalent resistance matrix of the traditional phase domain synchronous machine model and the matrix used in the calculation of the history term are converted into sparse matrices, thereby improving the computational efficiency of the model.

BRIEF DESCRIPTION OF THE DRAWINGS

In order to more clearly illustrate technical solutions in embodiments of the present disclosure or prior art, the drawings used in the description of the embodiments or prior art will be briefly introduced below. It is obvious that the drawings in the following description are certain embodiments of the present disclosure, and other drawings can be obtained in light of these drawings by those skilled in the art without any creative work.

DESCRIPTION OF THE EMBODIMENTS

In order to make the objectives, technical solutions and advantages of embodiments of the present disclosure more clear, the technical solutions of the embodiments of the present disclosure will be clearly and completely described in conjunction with the drawings in the embodiments of the present disclosure. Obviously, the described embodiments are partial embodiments of the disclosure and not all of the embodiments. All other embodiments obtained by those skilled in the art based on the embodiments of the present disclosure without creative efforts fall within the protection scope of the present disclosure.

It should be noted that in the description of the embodiments of the present disclosure, terms "comprises", "comprising" or any other variants thereof are intended to encompass a non-exclusive inclusion, such that processes, methods, articles or apparatus comprising a series of elements include not only those elements, but also other elements that are not explicitly listed, or elements that are inherent to those processes, methods, articles or apparatus. For those skilled in the art, the specific meanings of the terms above in the present disclosure can be understood in accordance with specific conditions.

Since a majority of coefficient matrices used in the calculation of the traditional EMTP-type phase domain synchronous machine model are full matrices, the operations between the full matrices are time consuming in the calculation of the traditional EMTP-type phase domain synchronous machine model, and thus the traditional EMTP-type phase domain synchronous machine model has the disadvantage of low computational efficiency.

Therefore, an embodiment of the present disclosure provides a method for improving the computational efficiency of the EMTP-type phase domain synchronous machine model. According to the method for improving the computational efficiency of the EMTP-type phase domain synchronous machine model provided by the embodiment of the disclosure, matrix relations between a mutual inductance matrix of stator windings and a mutual inductance matrix of rotor windings is acquired through a trigonometric transformation from the traditional phase domain synchronous machine model as a basis, and the matrix relations are substituted into the traditional phase domain synchronous machine model, such that the equivalent resistance matrix of the traditional phase domain synchronous machine model and the matrix used in the calculation of the history term are converted into sparse matrices. It solves such disadvantages of the traditional EMTP-type phase domain synchronous machine model as heavy computing burden and low computational efficiency, and the calculation efficiency of the model is improved.

Figure 1:
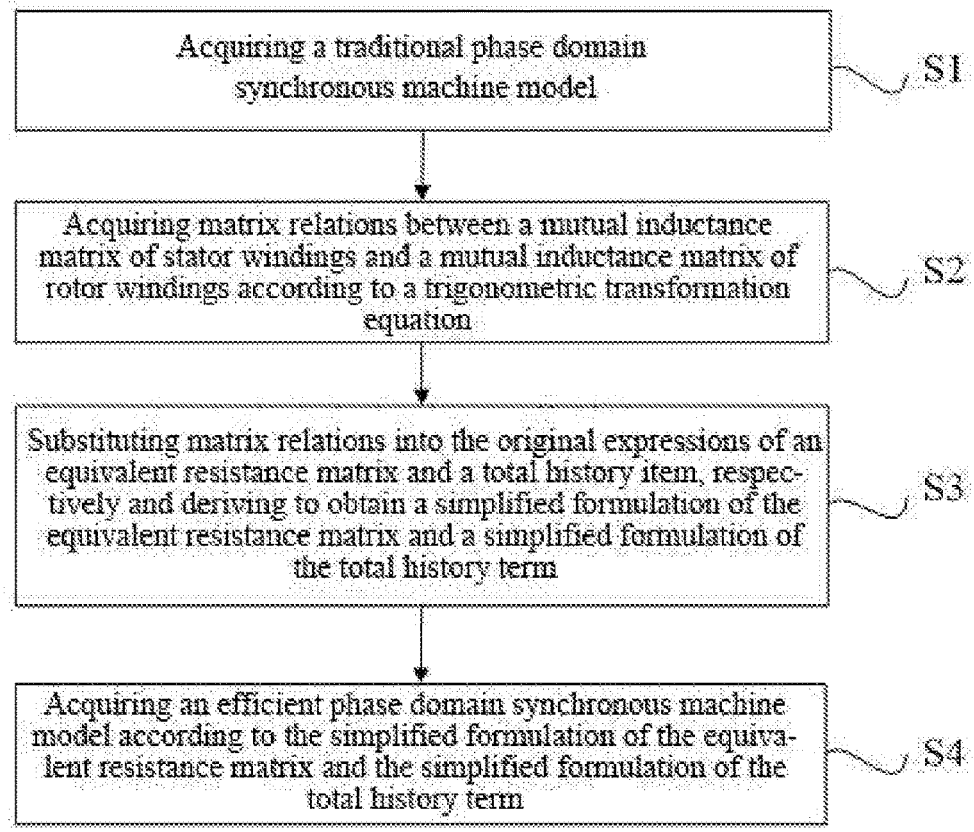
FIG. 1 is a schematic flowchart of a method for improving the computational efficiency of the EMTP-type phase domain synchronous machine model according to an embodiment of the present disclosure.

FIG. 1 is a schematic flowchart of a method for improving the computational efficiency of the EMTP-type phase domain synchronous machine model according to an embodiment of the present disclosure. Referring to FIG. 1, the method for improving the computational efficiency of the EMTP-type phase domain synchronous machine model may include:

S1, acquiring a traditional phase domain synchronous machine model; wherein the traditional phase domain synchronous machine model is: $v_{abcs}(t)=R_{eq}i_{abcs}+e_h(t)$; where $R_{eq}$ represents the equivalent resistance matrix; $i_{abcs}(t)$ represents the stator currents; $e_h(t)$ represents the total history term;

It should be noted that, in this embodiment, the total history term $e_h(t)$ refers to a history voltage source;

S2, acquiring matrix relations between a mutual inductance matrix of stator windings and a mutual inductance matrix of rotor windings according to a trigonometric transformation equation;

S3, substituting the matrix relations into the original formulation of the equivalent resistance matrix and the original formulation of the total history term, respectively, and deriving to obtain a simplified formulation of the equivalent resistance matrix and a simplified formulation of the total history term; and S4, acquiring an efficient phase domain synchronous machine model according to the simplified formulation of the equivalent resistance matrix and the simplified formulation of the total history term.

According to the embodiment, in step S1, acquiring the traditional phase domain synchronous machine model specifically may include as follows.

A voltage equation of the traditional EMTP-type phase domain synchronous machine model may be described by the equation (1):

$$\begin{bmatrix} v_{abcs}(t) \\ v_{qdr}(t) \end{bmatrix} = \frac{d}{dt} \begin{bmatrix} \lambda_{abcs}(t) \\ \lambda_{qdr}(t) \end{bmatrix} + \begin{bmatrix} R_s & 0 \\ 0 & R_r \end{bmatrix} \begin{bmatrix} -i_{abcs}(t) \\ i_{qdr}(t) \end{bmatrix} \quad (1)$$

For the sake of simplicity, in the following embodiments, the "EMTP-type phase domain synchronous machine model" is also referred to as "phase domain model".

$$v_{qdr}(t) = [v_{kq1}(t) \; v_{kq2}(t) \; v_{fd}(t) \; v_{kd}(t)] \quad (2)$$

$$i_{qdr}(t) = [i_{kq1}(t) \; i_{kq2}(t) \; i_{fd}(t) \; i_{kd}(t)] \quad (3)$$

$$\lambda_{qdr}(t) = [\lambda_{kq1}(t) \; \lambda_{kq2}(t) \; \lambda_{fd}(t) \; \lambda_{kd}(t)] \quad (4)$$

-continued $$R_s = \text{diag}[r_s \ r_s \ r_s] \quad (5)$$

$$R_r = \text{diag}[r_{kq1} \ r_{kq2} \ r_{fd} \ r_{kd}] \quad (6)$$

In the equations above, $v_{abcs}(t)$, and $v_{qdr}(t)$ represent stator voltages and rotor voltages, respectively; $\lambda_{abcs}(t)$, and $\lambda_{qdr}(t)$ represent stator flux linkages and rotor flux linkages, respectively; $R_s$ and $R_r$ represent the stator resistance matrix and rotor resistance matrix, respectively; and $i_{abcs}(t)$, and $i_{qdr}(t)$ represent stator currents and rotor currents, respectively. The subscripts kq1, kq2, fd, and kd represent the four different winding numbers of the machine, respectively.

In the case that the magnetic saturation effect of the machine is ignored, the magnetic flux linkages can be expressed by the following equation:

$$\begin{bmatrix} \lambda_{abcs}(t) \\ \lambda_{qdr}(t) \end{bmatrix} = \begin{bmatrix} L_s(\theta_r(t)) & L_{sr}(\theta_r(t)) \\ \frac{2}{3} L_{rs}(\theta_r(t)) & L_r \end{bmatrix} \begin{bmatrix} -i_{abcs}(t) \\ i_{qdr}(t) \end{bmatrix} \quad (7)$$

The specific expression is as follows:

$$L_s(\theta_r) = \begin{bmatrix} L_{ls} + L_A - L_B \cos 2\theta_r & -\frac{1}{2} L_A - L_B \cos 2\left(\theta_r - \frac{\pi}{3}\right) & -\frac{1}{2} L_A - L_B \cos 2\left(\theta_r + \frac{\pi}{3}\right) \\ -\frac{1}{2} L_A - L_B \cos 2\left(\theta_r - \frac{\pi}{3}\right) & L_{ls} + L_A - L_B \cos 2\left(\theta_r - \frac{\pi}{3}\right) & -\frac{1}{2} L_A - L_B \cos 2(\theta_r + \pi) \\ -\frac{1}{2} L_A - L_b \cos 2\left(\theta_r + \frac{\pi}{3}\right) & -\frac{1}{2} L_A - L_B \cos 2(\theta_r + \pi) & L_{ls} + L_A - L_B \cos 2\left(\theta_r + \frac{\pi}{3}\right) \end{bmatrix} \quad (8)$$

$$L_A = \frac{L_{md} + L_{mq}}{3}, \ L_B = \frac{L_{md} - L_{mq}}{3} \quad (9)$$

$$L_{sr}(\theta_r) = \begin{bmatrix} L_{mq} \cos \theta_r & L_{mq} \cos \theta_r & L_{mq} \cos \theta_r & L_{md} \sin \theta_r & L_{md} \sin \theta_r \\ L_{mq} \cos\left(\theta_r - \frac{\pi}{3}\right) & L_{mq} \cos\left(\theta_r - \frac{\pi}{3}\right) & L_{mq} \cos\left(\theta_r - \frac{\pi}{3}\right) & L_{md} \sin\left(\theta_r - \frac{\pi}{3}\right) & L_{md} \sin\left(\theta_r - \frac{\pi}{3}\right) \\ L_{mq} \cos\left(\theta_r + \frac{\pi}{3}\right) & L_{mq} \cos\left(\theta_r + \frac{\pi}{3}\right) & L_{mq} \cos\left(\theta_r + \frac{\pi}{3}\right) & L_{md} \sin\left(\theta_r + \frac{\pi}{3}\right) & L_{md} \sin\left(\theta_r + \frac{\pi}{3}\right) \end{bmatrix} \quad (10)$$

$$L_{rs}(\theta_r) = \frac{2}{3} L_{sr}^T(\theta_r) \quad (11)$$

$$L_r = \begin{bmatrix} L_{lkq1} + L_{mq} & L_{mq} & L_{mq} & 0 & 0 \\ L_{mq} & L_{lkq2} + L_{mq} & L_{mq} & 0 & 0 \\ L_{mq} & L_{mq} & L_{lkq2} + L_{mq} & 0 & 0 \\ 0 & 0 & 0 & L_{lfd} + L_{md} & L_{md} \\ 0 & 0 & 0 & L_{md} & L_{lkd} + L_{md} \end{bmatrix} \quad (12)$$

In the equations above, $\lambda_{abcs}(t)$, and $\lambda_{qdr}(t)$ represent the stator flux linkages and rotor flux linkages, respectively; $\theta_r(t)$ represents the rotor angle; $L_s(\theta_r(t))$ is the stator inductance matrix; $L_r$ is the rotor inductance matrix; $L_{sr}(\theta_r(t))$ and $L_{rs}(\theta_r(t))$ represent mutual inductance matrices of the stator windings and rotor windings; and $L_{sr}(\theta_r))$ and $L_{rs}(\theta_r)$ represent the mutual inductance matrix of the stator windings and the mutual inductance matrix of the rotor windings, respectively. $r_{kq1}$, $r_{kq2}$, $r_{kq3}$, $r_{fd}$, $r_{kd}$ represent the resistances of the windings kq1, kq2, kq3, fd, kd, respectively; $L_{ikq1}$, $L_{lkq2}$, $L_{lfd}$, $L_{lkd}$ represent the inductances of the windings kq1, kq2, fd, kd, respectively; $L_{md}$ and $L_{mq}$ represent the mutual inductances.

The voltage equation of the stator in the equation (1) can be discretized by the trapezoidal integration method to obtain:

$$v_{abcs}(t) = -R_s i_{abcs}(t) + \frac{2}{\Delta t} \lambda_{abcs}(t) + e_{sh}(t) \quad (13)$$

In the equation above, $$e_{sh}(t) = -R_s i_{abcs}(t - \Delta t) - \frac{2}{\Delta t} \lambda_{abcs}(t - \Delta t) - v_{abcs}(t - \Delta t) \quad (14)$$

In the equation above, $v_{abcs}(t)$ represents the stator voltages; $\lambda_{abcs}(t)$ represents the stator magnetic flux, $R_s$ represents the stator resistance matrix, $i_{abcs}(t)$ represents stator currents. $\Delta t$ is the time-step size, and $e_{sh}(t)$ is the current history term.

The equation (7) is substituted into the equation (13) to obtain:

$$v_{abcs}(t) = -\left(R_s + \frac{2}{\Delta t}L_s(\theta_r(t))\right)i_{abcs}(t) + \frac{2}{\Delta t}L_{sr}(\theta_r(t))i_{qdr}(t) + e_{sh}(t) \quad (15)$$

Correspondingly, the trapezoidal integration method is applied to the rotor voltage equation in the discrete equation (1) to obtain:

$$i_{qdr}(t) = \left(R_r + \frac{2}{\Delta t}L_r\right)^{-1}\left(v_{qdr}(t) + \frac{2}{\Delta t}\frac{2}{3}L_{rs}(\theta_r(t))i_{abcs}(t) + e_{rh}(t)\right) \quad (16)$$

In the equation above, $$e_{rh}(t) = \quad (17)$$
$$\left(-R_r + \frac{2}{\Delta t}L_r\right)i_{qdr}(t-\Delta t) - \frac{2}{\Delta t}\frac{2}{3}L_{rs}(t-\Delta t)i_{abcs}(t-\Delta t) + v_{qdr}(t-\Delta t)$$

In the equation above, $e_{rh}(t)$ represents the rotor history term.

The equation (16) is substituted into the equation (15) to obtain:

$$v_{abcs}(t) = R_{eq}i_{abcs}(t) + e_h(t) \quad (18)$$

In the equation above, $$R_{eq}(t) = -R_s - \frac{2}{\Delta t}L_s(\theta_r(t)) + \frac{8}{3\Delta t\Delta t}L_{sr}(\theta_r(t))\left(R_r + \frac{2}{\Delta t}L_r\right)^{-1}L_{rs}(\theta_r(t)) \quad (19)$$

$$e_h(t) = e_{sh}(t) + \frac{2}{\Delta t}L_{sr}(\theta_r(t))\left(R_r + \frac{2}{\Delta t}L_r\right)^{-1}(v_{qdr}(t) + e_{rh}(t)) \quad (20)$$

In the equations above, $v_{abcs}(t)$ represents the stator voltages, $R_{eq}$ represents the equivalent resistance matrix, $e_h(t)$ is the total history term; $R_s$ and $R_r$ represent the stator resistance matrix and rotor resistance matrix, respectively; $L_s(\theta_r(t))$ is the stator inductance matrix; $L_r$ is the rotor inductance matrix; $L_{sr}(\theta_r(t))$ and $L_{rs}(\theta_r(t))$ represent the mutual inductance matrix of the stator windings and the mutual inductance matrix of the rotor windings; $e_{sh}(t)$ represents the current history term and $e_{rh}(t)$ represents the rotor history term.

The equation (18) is the traditional phase domain synchronous machine model.

It should be noted that since matrices $L_{sr}(\theta_r(t))$, $L_{rs}(\theta_r(t))$ and $L_s(\theta_r(t))$ required for $R_{eq}(t)$ and $e_h(t)$ in the traditional phase domain model are all full matrices, the calculation efficiency is low. In order to improve the computational efficiency of the model, the present disclosure provides an optimized calculation method and finally constructs an efficient phase domain synchronous machine model based on this optimized calculation method.

Further, in step S2, the acquiring matrix relations between a mutual inductance matrix of stator windings and a mutual inductance matrix of rotor windings according to a trigonometric transformation equation specifically includes as follows.

According to the trigonometric transformation, the following relations hold:

$$L_s(\theta_r) = K^{-1}(\theta_r)L_s^r K(\theta_r) \quad (21)$$

$$L_{sr}(\theta_r) = K^{-1}(\theta_r)L_{sr}^r \quad (22)$$

$$\tfrac{2}{3}L_{rs}(\theta_r) = L_{rs}^r K(\theta_r) \quad (23)$$

In the equations above, $L_{sr}(\theta_r(t))$ and $L_{rs}(\theta_r(t))$ represent the mutual inductance matrix of the stator windings and the mutual inductance matrix of the rotor windings, respectively; and $K(\theta_r)$ and $K^{-1}(\theta_r)$ represent Park transformation and inverse Park transformation, respectively.

In the equations above, $$L_s^r = \text{diag}[L_{ls} + L_{mq}\ L_{ls} + L_{md}\ L_{ls}] \quad (24)$$

$$L_{sr}^r = \begin{bmatrix} L_{mq} & L_{mq} & L_{mq} & 0 & 0 \\ 0 & 0 & 0 & L_{md} & L_{md} \\ 0 & 0 & 0 & 0 & 0 \end{bmatrix} \quad (25)$$

$$L_{rs}^r = (L_{sr}^r)^T \quad (26)$$

$$K(\theta_r) = \frac{2}{3}\begin{bmatrix} \sin\theta_r & \sin\left(\theta_r - \frac{2\pi}{3}\right) & \sin\left(\theta_r + \frac{2\pi}{3}\right) \\ \cos\theta_r & \cos\left(\theta_r - \frac{2\pi}{3}\right) & \cos\left(\theta_r + \frac{2\pi}{3}\right) \\ 0.5 & 0.5 & 0.5 \end{bmatrix} \quad (27)$$

$$K^{-1}(\theta_r) = \begin{bmatrix} \cos\theta_r & \sin\theta_r & 1 \\ \cos\left(\theta_r - \frac{2\pi}{3}\right) & \sin\left(\theta_r - \frac{2\pi}{3}\right) & 1 \\ \cos\left(\theta_r + \frac{2\pi}{3}\right) & \cos\left(\theta_r + \frac{2\pi}{3}\right) & 1 \end{bmatrix} \quad (28)$$

Further, in step S3, the matrix relations above are substituted into the original formulation of the equivalent resistance matrix $R_{eq}$ and the original formulation of the total history term $e_h(t)$ respectively to be derived, to obtain a simplified formulation of the equivalent resistance matrix $R_{eq}$ and a simplified formulation of the total history term $e_h(t)$.

Specifically, the equations (21), (22), and (23) are substituted into the equation (19) and derived to obtain:

$$R_{eq}(t) = -R_s + K^{-1}(\theta_r)R_{ab}K(\theta_r) \quad (29)$$

In the equation above, $$R_{ab} = -\frac{2}{\Delta t}L_s^r + \frac{4}{\Delta t\Delta t}L_{sr}^r\left(R_r + \frac{2}{\Delta t}L_r\right)^{-1}L_{rs}^r \quad (30)$$

The matrix $R_{ab}$ can be further derived into the sum of the two partial matrices as follows:

$$R_{ab} = R_a + R_b \quad (31)$$

$$R_a = \text{diag}[R_{a1}\ R_{a1}\ R_{a2}] \quad (32)$$

$$R_b = \text{diag}[0\ R_b\ 0] \quad (33)$$

In the equations above, $$R_{a1} = \frac{4}{\Delta t \Delta t} L_{mq}^2 \frac{a+b-2e}{ab-e^2} - \frac{2}{\Delta t}(L_{mq}+L_{ls}) \quad (34)$$

$$R_{a2} = -\frac{2}{\Delta t}L_{ls} \quad (35)$$

$$R_b = \frac{4}{\Delta t \Delta t} L_{md}^2 \frac{c+d-2f}{cd-f^2} - \frac{2}{\Delta t}(L_{md}+L_{ls}) - R_{a1} \quad (36)$$

$$a = r_{kq1} + \frac{2}{\Delta t}(L_{mq}+L_{lkq1}) \quad (37)$$

$$b = r_{kq2} + \frac{2}{\Delta t}(L_{mq}+L_{lkq2}) \quad (38)$$

$$c = r_{fd} + \frac{2}{\Delta t}(L_{md}+L_{lfd}) \quad (39)$$

$$d = r_{kd} + \frac{2}{\Delta t}(L_{md}+L_{lkd}) \quad (40)$$

$$e = \frac{2}{\Delta t}L_{mq} \quad (41)$$

$$f = \frac{2}{\Delta t}L_{md} \quad (42)$$

The equation (31) is substituted into the equation (29) to obtain:

$$R_{eq}(t) = -R_s + K^{-1}(\theta_r)R_a K(\theta_r) + K^{-1}(\theta_r)R_b K(\theta_r) \quad (43)$$

The equations (27) and (28) are substituted into a second term on the right side of the equation (43) to obtain:

$$K^{-1}(\theta_r)R_a K(\theta_r) = \frac{2}{3}\begin{bmatrix} R_{a1}+\frac{R_{a2}}{2} & -\frac{R_{a1}}{2}+\frac{R_{a2}}{2} & -\frac{R_{a1}}{2}+\frac{R_{a2}}{2} \\ -\frac{R_{a1}}{2}+\frac{R_{a2}}{2} & R_{a1}+\frac{R_{a2}}{2} & -\frac{R_{a1}}{2}+\frac{R_{a2}}{2} \\ -\frac{R_{a1}}{2}+\frac{R_{a2}}{2} & -\frac{R_{a1}}{2}+\frac{R_{a2}}{2} & R_{a1}+\frac{R_{a2}}{2} \end{bmatrix} \quad (44)$$

As shown in the equation (44), $K^{-1}(\theta_r)R_a K(\theta_r)$ is a constant term. At this time, $R_{eq}(t)$ can be derived to:

$$R_{eq}(t) = R_{eq,const} + \Delta R_{eq}(t) \quad (45)$$

In the equation above, $$R_{eq,const} = -R_s + K^{-1}(\theta_r)R_a K(\theta_r) \quad (46)$$

$$\Delta R_{eq}(t) = K^{-1}(\theta_r)R_b K(\theta_r) \quad (47)$$

In the equations above, $R_{eq}(t)$ represents the equivalent resistance matrix, $R_{eq,const}$ is a constant matrix and $\Delta R_{eq}(t)$ represents a variation matrix. In machine simulation, $R_{eq,const}$ is required to be calculated only once. In addition, since the matrix $R_b$ contains only one element, calculating $\Delta R_{eq}(t)$ does not excessively consume time. Compared with $R_{eq}(t)$ (19) used in the traditional phase domain synchronous machine model, the amount of calculation can be effectively reduced using the efficient model (45) of $R_{eq}$ applied in the model according to the present disclosure, thereby improving the computational efficiency of the model.

Similar to the resistance matrix $R_{eq}$, the history term $e_h(t)$ used in the traditional phase domain synchronous machine model can also be efficient. Specific steps are as follows.

The equation (22) is substituted into the equation (20) to obtain:

$$e_h(t) = e_{sh}(t) + \frac{2}{\Delta t}K^{-1}(\theta_r(t))L_{sr}^r\left(R_r+\frac{2}{\Delta t}L_r\right)^{-1}(v_{qdr}(t)+e_{rh}(t)) \quad (48)$$

The equation (23) is substituted into $e_{rh}(t)$ (17) and the phase domain signal is converted into the signal $i_{qd0s}(t-\Delta t)$ in a qd coordinate system to provide:

$$v_{qdr}(t) + e_{rh}(t) = \quad (49)$$
$$v_{qdr}(t) - \left(R_r - \frac{2}{\Delta t}L_r\right)i_{qdr}(t-\Delta t) - \frac{2}{\Delta t}L_{rs}^r i_{qd0s}(t-\Delta t) + v_{qdr}(t-\Delta t)$$

The equation (49) is substituted into the equation (48) and derived to obtain:

$$e_h(t) = e_{sh}(t) + K^{-1}(\theta_r)(M_a e_{rh}^r - R_f i_{qd0s}(t-\Delta t)) \quad (50)$$

$$M_a = \frac{2}{\Delta t}L_{sr}^r\left(R_r+\frac{2}{\Delta t}L_r\right)^{-1} \quad (51)$$

$$R_f = \frac{2}{\Delta t}\frac{2}{\Delta t}L_{sr}^r\left(R_r+\frac{2}{\Delta t}L_r\right)^{-1}L_{rs}^r \quad (52)$$

$$e_{rh}^r = v_{qdr}(t) + v_{qdr}(t-\Delta t) - \left(R_r - \frac{2}{\Delta t}L_r\right)i_{qdr}(t-\Delta t) \quad (53)$$

In the equations above, the matrices $M_a$ and $R_f$ can be described by the following equation:

$$M_a = \begin{bmatrix} M_{a1} & M_{a2} & M_{a3} & 0 & 0 \\ 0 & 0 & 0 & M_{a4} & M_{a5} \\ 0 & 0 & 0 & 0 & 0 \end{bmatrix} \quad (54)$$

$$R_f = \begin{bmatrix} R_{f1} & 0 & 0 \\ 0 & R_{f2} & 0 \\ 0 & 0 & 0 \end{bmatrix} \quad (55)$$

In the equations above, $$M_{a1} = \frac{be-e^2}{ab-e^2} \quad (56)$$

$$M_{a2} = \frac{ae-e^2}{ab-e^2} \quad (57)$$

$$M_{a3} = \frac{df-f^2}{cd-f^2} \quad (58)$$

$$M_{a4} = \frac{cf-f^2}{cd-f^2} \quad (59)$$

$$R_{f1} = e(M_{a1}+M_{a2}) \quad (60)$$

$$R_{f2} = f(M_{a3}+M_{a4}) \quad (61)$$

In the equations above, $e_{sh}(t)$ represents the current history term, $K^{-1}(\theta_r)$ represents inverse Park transformation, $i_{qd0s}(t-\Delta t)$ is stator currents in qd0 coordinates, $\Delta t$ is the time-step size, $M_a$ and $R_f$ are both sparse matrices; $L_s^r$, $L_{sr}^r$ and $L_{rs}^r$ are constant matrices, $L_r$ is the rotor inductance matrix, $R_s$ represents the stator resistance matrix; $R_r$ represents the rotor resistance matrix, $v_{qdr}$(t) represents the rotor voltages, $i_{qdr}$(t-Δt) represents the rotor currents and $v_{qdr}$(t-Δt) represents the rotor voltages.

An efficient model of $e_h$(t) provided according to the present disclosure is shown in the equation (50). $M_a$ and $R_f$ used in the equation (50) are both sparse matrices. Compared with $e_h$(t) (20) used in the traditional phase domain synchronous machine model, the amount of calculation can be effectively reduced using the efficient model of $e_h$(t) provided according to the present disclosure, thereby improving the computational efficiency of the model.

In summary, the efficient phase domain synchronous machine model is:

$$v_{abcs}(t)=R_{eq}i_{abcs}(t)+e_h(t)$$

Wherein: $R_{eq}(t)=R_{eq,const}+\Delta R_{eq}(t)$ $$e_h(t)=e_{sh}(t)+K^{-1}(\theta_r)(M_a e_{rh}^r - R_f i_{qd0s}(t-\Delta t))$$

In the equations above, $R_{eq}$(t) represents the equivalent resistance matrix, $R_{eq,const}$ is a constant matrix and $\Delta R_{eq}$(t) represents a variation matrix. $e_{sh}$(t) represents a current history term, $K^{-1}(\theta_r)$ represents inverse Park transformation, $i_{qd0s}$ (t-Δt) is stator currents in qd coordinates, Δt is the time-step size, $M_a$ and $R_f$ are both sparse matrices; $L_s^r$, $L_{sr}^r$ and $L_{rs}^r$ are constant matrices, $L_r$ is a rotor inductance matrix and $i_{qdr}$ (t-Δt) represents the rotor currents.

According to the method for improving the computational efficiency of the EMTP-type phase domain synchronous machine model provided by the embodiments of the disclosure, matrix relations between a mutual inductance matrix of stator windings and a mutual inductance matrix of rotor windings is acquired through a trigonometric transformation from the traditional phase domain synchronous machine model as a basis, and the matrix relations are substituted into the traditional phase domain synchronous machine model, such that the equivalent resistance matrix of the traditional phase domain synchronous machine model and the matrix used in the calculation of the history term are converted into sparse matrices, thereby improving the calculation efficiency of the model.

Based on the embodiments above, the following steps are performed so as to test the accuracy of the proposed efficient phase domain synchronous machine model:

simulating the traditional phase domain synchronous machine model and a proposed efficient phase domain synchronous machine model, respectively, comparing simulation results and evaluating the accuracies of the models.

Specifically, the accuracy of the efficient phase domain synchronous machine model is tested according to the present embodiment after the efficient phase domain synchronous machine model is acquired. For comparative analysis, the efficient phase domain synchronous machine model and the traditional phase domain synchronous machine model were simulated, respectively, and the accuracies of the models were evaluated. A time-step size of 500 μs is used in both of the two models.

Figure 2:
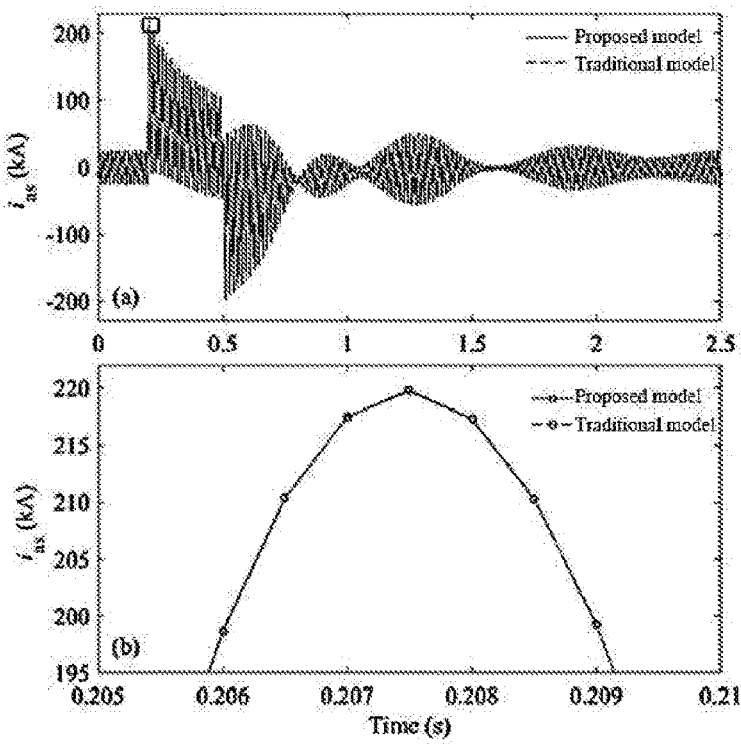
FIG. 2 is a curve of stator phase a current of the synchronous machine according to an embodiment of the present disclosure.

The test machine is an 835MVA synchronous machine. The machine stator is connected to an ideal voltage source. In the initial stage, the machine is in a steady state. The mechanical torque is $1.887 \times 10^6$ N·m, and the excitation voltage is 30.3 V. At t=0.2 s, three-phase ground fault occurs at the stator. The fault is removed at t=0.5 s. FIG. 2 is a curve of a stator phase a current of a synchronous machine. It should be noted that (a) at the top of FIG. 2 is the curve of the stator phase a current of the 835MVA synchronous machine and (b) at the bottom of FIG. 2 is a partial enlarged view of the curve of the stator phase a current of the synchronous machine.

Figure 3:
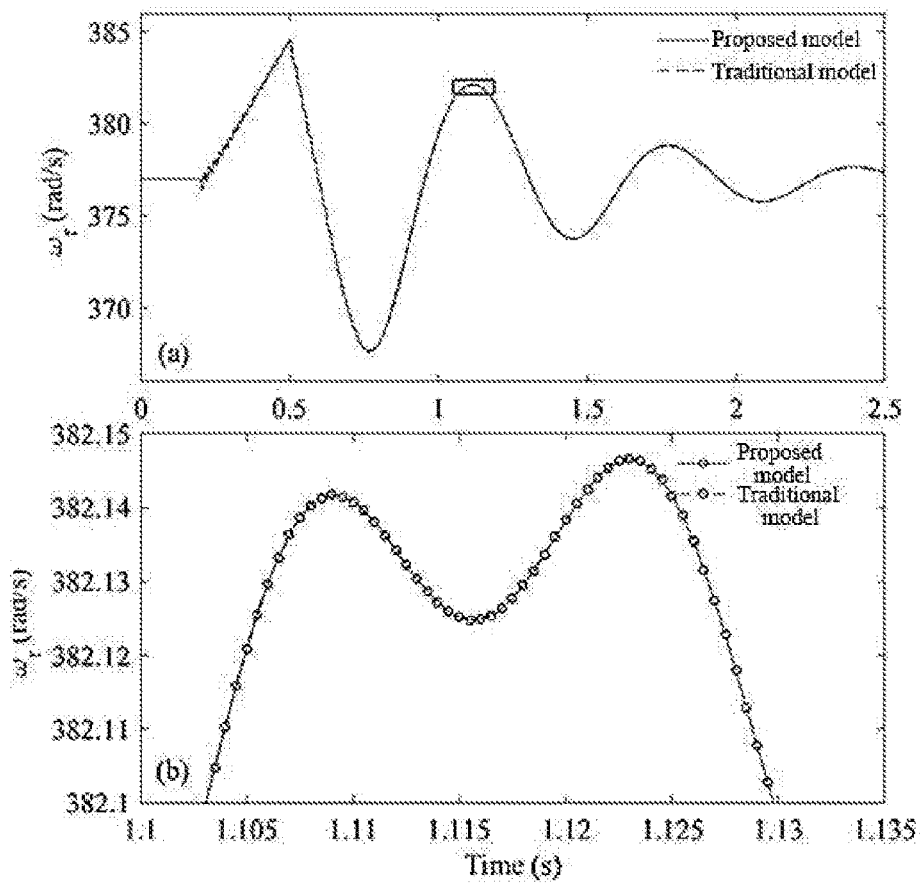
FIG. 3 is a curve of the rotor speed of the synchronous machine according to an embodiment of the present disclosure.

FIG. 3 shows the rotor speed of the synchronous machine. (a) at the top of FIG. 3 is the curve of the rotational speed of the 835MVA synchronous machine and (b) at the bottom of FIG. 3 is a partial enlarged view of (a). As shown in FIGS. 2 and 3, the simulation result of the machine model provided by the present disclosure is completely consistent with that of the traditional phase domain synchronous machine model. The reason is that the model provided by the present disclosure is derived from the traditional phase domain synchronous machine model. Therefore, it is completely equivalent to the traditional phase domain synchronous machine model, and no loss of precision occurs. It should be noted that in FIGS. 2 and 3, the "traditional model" refers to the traditional phase domain synchronous machine model, and the "proposed model" refers to the efficient model of the phase domain machine proposed in the embodiments of the present disclosure.

Based on the embodiments above, after the efficient phase domain synchronous machine model is acquired, the following steps are performed so as to evaluate the computational efficiency of the proposed efficient phase domain synchronous machine model:

comparing a CPU time per time-step required for the efficient phase domain synchronous machine model with that of the traditional phase domain synchronous machine model to evaluate the computational efficiency of the two models.

Specifically, the CPU time per time-step required for the efficient phase domain synchronous machine model provided by the embodiments of the present disclosure is compared with that of the traditional phase domain synchronous machine model. The two models are both constructed using standard C language programs, which are executed on a personal computer with parameters of Intel Core i7-7700HQ, 2.80-GHz processor, and 8 GB RAM. The CPU times per time-step required for the two models are shown in Table 1. The values in Table 1 are relative times, of which the unit is a per-unit value and the reference value is the CPU time consumption per time-step used in the traditional phase domain model. As shown in Table 1, the calculation time of the model proposed according to the present disclosure is (1 p.u.)/(0.6435 p.u.)≈1.554 times of that of the traditional model.

In summary, compared with the traditional phase domain synchronous machine model, the efficient phase domain synchronous machine model provided according to the embodiments of the present disclosure does not have any precision loss, and the efficiency can be improved by 1.554 times.

TABLE 1

Comparisons between calculation times of two models

| Model of machine | CPU times per time-step (p.u.) |
|---|---|
| Traditional model of phase domain machine | 1 |
| Efficient model of phase domain machine | 0.6435 |

Figure 4:
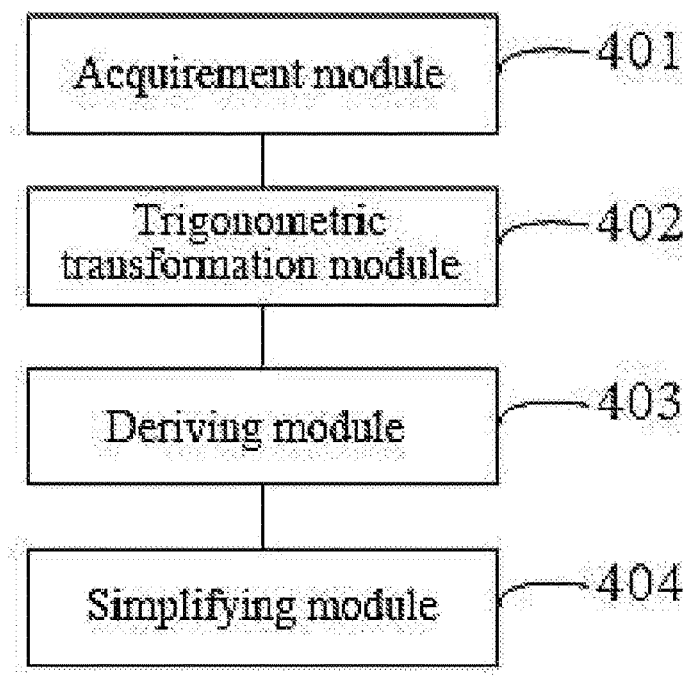
FIG. 4 is a structural block diagram of a device for improving the computational efficiency of the EMTP-type phase domain synchronous machine model according to an embodiment of the present disclosure.

FIG. 4 is a structural block diagram of a device for improving the computational efficiency of the EMTP-type phase domain synchronous machine model according to an embodiment of the present disclosure. Referring to FIG. 4, the device may include an acquirement module 401, a trigonometric transformation module 402, a deriving module 403 and a simplifying module 404.

The acquirement module 401 is suitable for acquiring a traditional phase domain synchronous machine model; wherein the traditional phase domain synchronous machine model is: $v_{abcs}(t)=R_{eq}i_{abcs}+e_h(t)$; where $R_{eq}$ represents the equivalent resistance matrix; $i_{abcs}(t)$ represents the stator currents; and $e_h(t)$ represents the total history term. The trigonometric transformation module 402 is suitable for acquiring matrix relations between a mutual inductance matrix of stator windings and a mutual inductance matrix of rotor windings according to a trigonometric transformation equation. The deriving module 403 is suitable for substituting the matrix relations into the original formulation of $R_{eq}$ and the original formulation of $e_h(t)$ respectively and deriving to obtain a simplified formulation of the equivalent resistance matrix $R_{eq}$ and an efficient model of the total history term $e_h(t)$. The simplifying module 404 is suitable for acquiring an efficient phase domain synchronous machine model according to the simplified formulation of the equivalent resistance matrix $R_{eq}$ and the simplified formulation of the total history term $e_h(t)$.

The specific illustrations of device embodiments of the present disclosure are the same as those of the method above and are not described herein again.

According to the device for improving the computational efficiency of the EMTP-type phase domain synchronous machine model provided by the embodiments of the present disclosure, matrix relations between a mutual inductance matrix of stator windings and a mutual inductance matrix of rotor windings is acquired through a trigonometric transformation from the traditional phase domain synchronous machine model as a basis and the matrix relations are substituted into the traditional phase domain synchronous machine model, such that the equivalent resistance matrix of the traditional phase domain synchronous machine model and the matrix used in the calculation of the history term are converted into sparse matrices, thereby improving the calculation efficiency of the model.

Based on the above embodiments, the device may further include a comparison and evaluation module suitable for simulating the traditional phase domain synchronous machine model and the efficient phase domain synchronous machine model, respectively, comparing simulation results and evaluating the model deviation.

Specifically, the accuracy of the efficient phase domain synchronous machine model is tested according to the present embodiment after the efficient phase domain synchronous machine model is acquired. For comparative analysis, the efficient phase domain synchronous machine model and the traditional phase domain synchronous machine model are simulated respectively, and the model deviation is evaluated. A simulation time-step of 500 μs is used in both of the two models.

The test machine is an 835MVA synchronous machine. The machine stator is connected to an ideal voltage source. In the initial stage, the machine is in a steady state. The mechanical torque is $1.887 \times 10^6$ N·m, and the excitation voltage is 30.3 V. At t=0.2 s, three-phase ground fault occurs at the stator side. The fault is removed at t=0.5 s. FIG. 2 is a curve of a stator phase a current of a synchronous machine according to an embodiment of the present disclosure. FIG. 3 is a curve of a rotational speed of a synchronous machine according to an embodiment of the present disclosure. As shown in FIGS. 2 and 3, the simulation result of the machine model provided by the present disclosure is completely consistent with that of the traditional phase domain synchronous machine model since the proposed model of the present disclosure is derived from the traditional mode of the phase domain machine. Therefore, it is completely equivalent to the traditional phase domain synchronous machine model, and no loss of precision occurs. It should be noted that in FIGS. 2 and 3, the "traditional model" refers to the traditional phase domain synchronous machine model, and the "proposed model" refers to the efficient phase domain synchronous machine model proposed in the embodiments of the present disclosure.

Based on the various embodiments above, the device may further include an efficiency evaluation module suitable for comparing a CPU time per time-step required for the efficient phase domain synchronous machine model with that of the traditional phase domain synchronous machine model to evaluate the computational efficiency of the two models.

Specifically, the CPU time per time-step required for the efficient phase domain synchronous machine model provided by the embodiments of the present disclosure is compared with that of the traditional phase domain synchronous machine model. The two models are both constructed using standard C language programs, which are executed on a personal computer with parameters of Intel Core i7-7700HQ, 2.80-GHz processor, and 8 GB RAM. The CPU times per time-step required for the two models are shown in Table 1. The values in Table 1 are relative times, of which the unit is a per-unit value and the reference value is the CPU time consumption per time-step used in the traditional phase domain model. As shown in Table 1, the calculation time of the model proposed according to the present disclosure is (1 p.u.)/(0.6435 p.u.)≈1.554 times of that of the traditional model.

In summary, compared with the traditional phase domain synchronous machine model, the efficient phase domain synchronous machine model provided according to the embodiments of the present disclosure does not have any precision loss, and the efficiency can be improved by 1.554 times.

Figure 5:
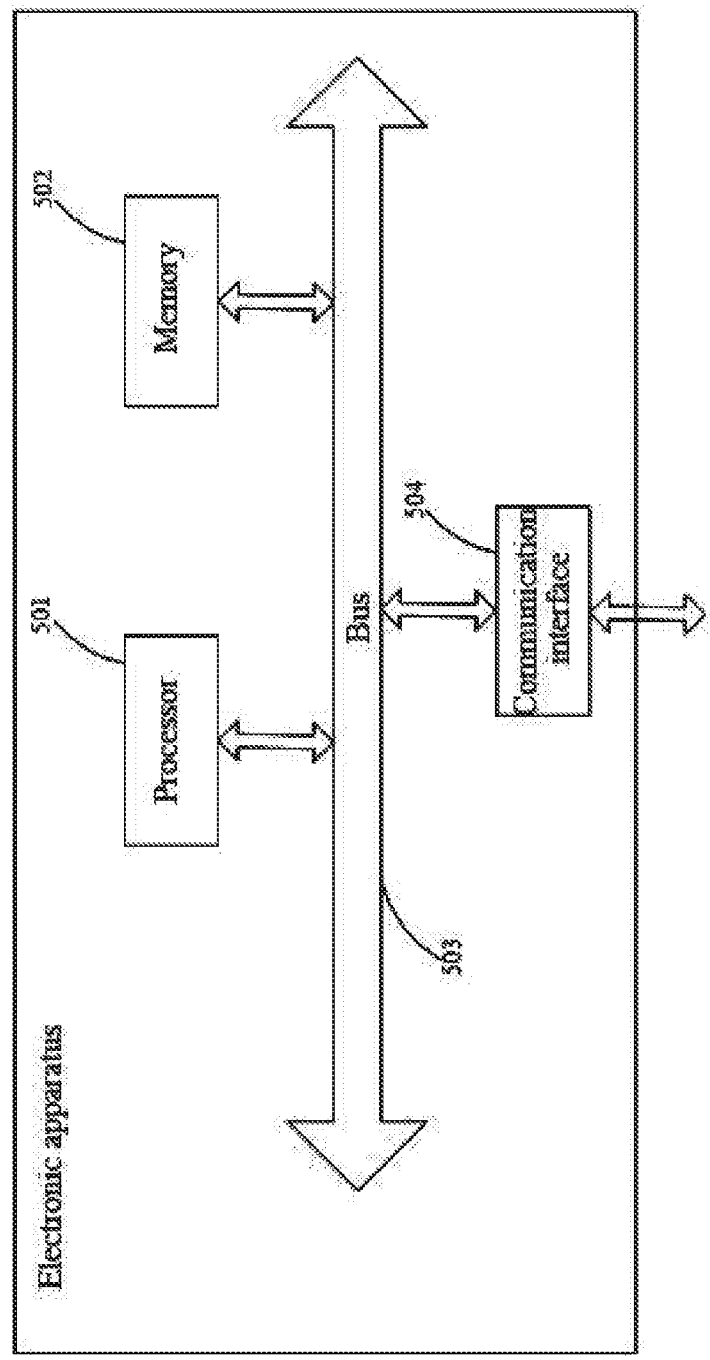
FIG. 5 is a schematic structural diagram of an electronic apparatus according to an embodiment of the present disclosure.

An embodiment of the present disclosure provides an electronic apparatus. FIG. 5 is a schematic structural diagram of an electronic apparatus according to an embodiment of the present disclosure. As shown in FIG. 5, the electronic apparatus may include:

at least one processor 501, a communication interface 504, at least one memory 502, and a communication bus 503, wherein the at least one processor 501, the communication interface 504, and the at least one memory 502 are communicated with each other via the communication bus 503. The at least one processor 501 can call the logic instructions in the at least one memory 502 to perform the method for optimizing the EMTP-type phase domain synchronous machine model, comprising, for example, the following steps: acquiring a traditional phase domain synchronous machine model; acquiring matrix relations between a mutual inductance matrix of stator windings and a mutual inductance matrix of rotor windings according to a trigonometric transformation equation; substituting the matrix relations into the original expression of $R_{eq}$ and the original expression of $e_h(t)$ respectively and deriving to obtain a simplified formulation of the equivalent resistance matrix $R_{eq}$ and a simplified formulation of the total history term $e_h(t)$; and acquiring a simplified formulation of the phase domain machine according to the efficient model of the equivalent resistance matrix $R_{eq}$ and the simplified formulation of the total history term $e_h(t)$.

An embodiment of the present disclosure provides a non-transitory computer readable storage medium. The non-transitory computer readable storage medium stores computer instructions which allow the computer to perform the method for improving the computational efficiency of the EMTP-type phase domain synchronous machine model provided by the corresponding embodiments. The method comprises, for example, the following steps: acquiring a traditional phase domain synchronous machine model; acquiring matrix relations between a mutual inductance matrix of stator windings and a mutual inductance matrix of rotor windings according to a trigonometric transformation equation; substituting the matrix relations into the original formulation of $R_{eq}$ and the original formulation of $e_h(t)$ respectively and deriving to obtain a simplified formulation of the equivalent resistance matrix $R_{eq}$ and a simplified formulation of the total history term $e_h(t)$; and acquiring an efficient phase domain synchronous machine model according to the simplified formulation of the equivalent resistance matrix $R_{eq}$ and the simplified formulation of the total history term $e_h(t)$.

It may be construed by those skilled in the art that the all or part of the steps of implementing the method embodiments above may be completed by using hardware related to the program instructions. The foregoing programs may be stored in a computer readable storage medium, and the programs perform steps including the steps of the foregoing method embodiments when executed. The foregoing storage medium may include various media such as a ROM, a RAM, a magnetic disk, or an optical disk, etc., that can store program codes.

Finally, it should be noted that the embodiments above are only used to illustrate the technical solutions of the present disclosure, and are not limited thereto; although the present disclosure has been described in detail with reference to the foregoing embodiments, those skilled in the art should understand that modifications may be made to the technical solutions described in the foregoing embodiments and equivalent substitutions may be made to some of the technical features thereof; these modifications or substitutions do not depart the nature of the corresponding technical solutions from the spirit and scope of the technical solutions of various embodiments according to the present disclosure.

What is claimed is:

1. A method for improving computational efficiency of an electromagnetic transients program (EMTP-type) phase domain synchronous machine model, comprising:
    S1, acquiring a traditional phase domain synchronous machine model; wherein the traditional phase domain synchronous machine model is: $v_{abcs}(t)=R_{eq} i_{absc}+e_h(t)$;
    wherein $R_{eq}$ represents equivalent resistance matrix; $i_{abcq}(t)$ represents stator currents; $e_h(t)$ represents a total history term;
    S2, acquiring matrix relations between a mutual inductance matrix of stator windings and a mutual inductance matrix of rotor windings according to a trigonometric transformation equation;
    S3, substituting the matrix relations into an original formulation of the equivalent resistance matrix $R_{eq}$ and an original formulation of the total history term $e_h(t)$ respectively and deriving to obtain a simplified formulation of the equivalent resistance matrix $R_{eq}$ and a simplified formulation of the total history term $e_h(t)$; and
    S4, acquiring an efficient phase domain synchronous machine model according to the simplified formulation of the equivalent resistance matrix $R_{eq}$ and the simplified formulation of the total history term $e_h(t)$.

2. The method for improving the computational efficiency of the EMTP-type phase domain synchronous machine model of claim 1, further comprising:
    simulating the traditional phase domain synchronous machine model and the efficient phase domain synchronous machine model, respectively, comparing simulation results and evaluating deviation between the traditional phase domain synchronous machine model and the efficient phase domain synchronous machine model.

3. The method for improving the computational efficiency of the EMTP-type phase domain synchronous machine model of claim 1, further comprising:
    comparing a CPU time per time-step required for the efficient phase domain synchronous machine model with that of the traditional phase domain synchronous machine model to evaluate computational efficiencies of the traditional phase domain synchronous machine model and the efficient phase domain synchronous machine model.

4. The method for improving the computational efficiency of the EMTP-type phase domain synchronous machine model of claim 1, wherein the traditional phase domain synchronous machine model specifically comprises:

$$v_{abcs}(t) = R_{eq} i_{abcs} + e_h(t),$$

wherein:

$$R_{eq}(t) = -R_s - \frac{2}{\Delta t} L_s(\theta_r(t)) + \frac{8}{3\Delta t \Delta t} L_{sr}(\theta_r(t))\left(R_r + \frac{2}{\Delta t} L_r\right)^{-1} L_{rs}(\theta_r(t))$$

$$e_h(t) = e_{sh}(t) + \frac{2}{\Delta t} L_{sr}(\theta_r(t))\left(R_r + \frac{2}{\Delta t} L_r\right)^{-1} (v_{qdr}(t) + e_{rh}(t))$$

in the equation above, $v_{abcs}(t)$ represents stator voltages, $R_{eq}$ represents the equivalent resistance matrix, $e_h(t)$ is the total history term; $R_s$ and $R_r$ represent stator resistance matrix and rotor resistance matrix respectively, $L_s(\theta_r(t))$ is a stator inductance matrix; $L_r$ is a rotor inductance matrix; $L_{sr}(\theta_r(t))$ and $L_{rs}(\theta_r(t))$ represent the mutual inductance matrix of the stator windings and the mutual inductance matrix of the rotor windings, respectively, $e_{sh}(t)$ represents a current history term and $e_{rh}(t)$ represents a rotor history term.

5. The method for improving the computational efficiency of the
    EMTP-type phase domain synchronous machine model of claim 4, wherein in step S2, the acquiring matrix relations between the mutual inductance matrix of stator windings and the mutual inductance matrix of rotor windings according to the trigonometric transformation equation specifically comprises:
    acquiring the following relations according to the trigonometric transformation equation:

$$L_s(\theta_r) = K^{-1}(\theta_r) L_s^r K(\theta_r)$$

$$L_{sr}(\theta_r) = K^{-1}(\theta_r) L_{sr}^r$$

$$\tfrac{2}{3} L_{rs}(\theta_r) = L_{rs}^r K(\theta_r)$$

in the equations above, $L_{sr}(\theta_r(t))$ and $L_{rs}(\theta_r(t))$ represent the mutual inductance matrix of the stator windings and the mutual inductance matrix of the rotor windings, respectively; and k($\theta_r$) and $K^{-1}(\theta_r)$ represent Park transformation and inverse Park transformation, respectively;

in the equations above, $L_s^r$, $L_{sr}^r$, and $L_{rs}^r$ are constant matrices and specifically as follows:

$$L_s^r = \text{diag}[L_{ls} + L_{mq} \; L_{ls} + L_{md} \; L_{ls}]$$

$$L_{sr}^r = \begin{bmatrix} L_{mq} & L_{mq} & L_{mq} & 0 & 0 \\ 0 & 0 & 0 & L_{md} & L_{md} \\ 0 & 0 & 0 & 0 & 0 \end{bmatrix}$$

$$L_{rs}^r = (L_{sr}^r)^T$$

$$K(\theta_r) = \frac{2}{3} \begin{bmatrix} \sin\theta_r & \sin\left(\theta_r - \frac{2\pi}{3}\right) & \sin\left(\theta_r + \frac{2\pi}{3}\right) \\ \cos\theta_r & \cos\left(\theta_r - \frac{2\pi}{3}\right) & \cos\left(\theta_r + \frac{2\pi}{3}\right) \\ 0.5 & 0.5 & 0.5 \end{bmatrix}$$

$$K^{-1}(\theta_r) = \begin{bmatrix} \cos\theta_r & \sin\theta_r & 1 \\ \cos\left(\theta_r - \frac{2\pi}{3}\right) & \sin\left(\theta_r - \frac{2\pi}{3}\right) & 1 \\ \cos\left(\theta_r + \frac{2\pi}{3}\right) & \sin\left(\theta_r + \frac{2\pi}{3}\right) & 1 \end{bmatrix}.$$

6. The method for improving the computational efficiency of the EMTP-type phase domain synchronous machine model of claim 5, wherein step S3 specifically comprises:

S31, substituting the matrix relations above into the original formulation of the equivalent resistance matrix $R_{eq}$ and deriving to obtain the simplified formulation of the equivalent resistance matrix $R_{eq}$:

$$R_{eq}(t) = R_{eq,const} + \Delta R_{eq}(t)$$

wherein $R_{eq,const} = -R_s + K^{-1}(\theta_r) R_a K(\theta_r)$ $$\Delta R_{eq}(t) = K^{-1}(\theta_r) R_b K(\theta_r)$$

in the equations above, $R_{eq}(t)$ represents the equivalent resistance matrix, $R_{eq,const}$ is a constant matrix and $\Delta R_{eq}(t)$ represents a variation matrix;

S32, substituting the matrix relations above into the original formulation of the total history term $e_h(t)$ and deriving to obtain the efficient model of $e_h(t)$:

$$e_h(t) = e_{sh}(t) + K^{-1}(\theta_r)(M_a e_{rh}^r - R_f i_{qd0s}(t - \Delta t))$$

wherein $M_a = \frac{2}{\Delta t} L_{sr}^r \left(R_r + \frac{2}{\Delta t} L_r\right)^{-1}$ $$R_f = \frac{2}{\Delta t} \frac{2}{\Delta t} L_{sr}^r \left(R_r + \frac{2}{\Delta t} L_r\right)^{-1} L_{rs}^r$$

$$e_{rh}^r = v_{qdr}(t) + v_{qdr}(t - \Delta t) - \left(R_r - \frac{2}{\Delta t} L_r\right) i_{qdr}(t - \Delta t)$$

in the equations above, $e_{sh}(t)$ represents the current history term, $K^{-1}(\theta_r)$ represents the inverse Park transformation, $i_{qd0s}(t-\Delta t)$ is stator currents in qd coordinates, $\Delta t$ is the time-step size, $M_a$ and $R_f$ are both sparse matrices; $L_s^r$, $L_{sr}^r$, $L_{rs}^r$ are constant matrices, $L_r$ is a rotor inductance matrix, $R_r$ represents a rotor resistance matrix, $v_{qdr}(t)$ represents rotor voltages, $i_{qdr}(t-\Delta t)$ represents rotor currents and $v_{qdr}(t-\Delta t)$ represents the rotor voltages.

7. A device for improving the computational efficiency of an EMTP-type phase domain synchronous machine model, comprising:

an acquirement module, for acquiring a traditional phase domain synchronous machine model; wherein the traditional phase domain synchronous machine model is: $v_{abcs}(t) R_{eq} i_{abcs} + e_h(t)$ where Req represents an equivalent resistance matrix; $i_{abcs}(t)$ represents stator currents; $e_h(t)$ represents a total history term;

a trigonometric transformation module, for acquiring matrix relations between a mutual inductance matrix of stator windings and a mutual inductance matrix of rotor windings according to a trigonometric transformation equation;

a deriving module, for substituting the matrix relations into an original expression of $R_{eq}$ and an original expression of $e_h(t)$ respectively and deriving to obtain a simplified formulation of the equivalent resistance matrix $R_{eq}$ and a simplified formulation of the total history term $e_h(t)$; and a simplifying module, for acquiring an efficient phase domain synchronous machine model according to the simplified formulation of the equivalent resistance matrix $R_{eq}$ and the simplified formulation of the total history term $e_h(t)$.

8. The device for improving the computational efficiency of the EMTP-type phase domain synchronous machine model of claim 7, further comprising:

an efficiency evaluation module, for comparing a CPU time per time-step required for the efficient phase domain synchronous machine model with that of the traditional phase domain synchronous machine model to evaluate computational efficiencies of the traditional phase domain synchronous machine model and the efficient phase domain synchronous machine model.

9. An electronic apparatus, comprising:

at least one processor, at least one memory, a communication interface, and a communication bus; wherein, the at least one processor, the at least one memory and the communication interface communicate with each other via the communication bus;

program instructions which can be executed by the at least one processor are stored in the at least one memory, and the at least one processor calls the program instructions to perform the method for improving the computational efficiency of the EMTP-type phase domain synchronous machine model according to claim 1.

10. A non-transitory computer readable storage medium, storing computer instructions which allow a computer to perform the method for improving the computational efficiency of the EMTP-type phase domain synchronous machine model according to claim 1.

* * * * *